(12) United States Patent
Swanson et al.

(10) Patent No.: US 9,245,021 B2
(45) Date of Patent: Jan. 26, 2016

(54) METHOD AND SYSTEM FOR TRACKING ONLINE PROMOTIONAL SOURCE TO OFFLINE ACTIVITY

(75) Inventors: Gregory Earl Swanson, Fuqua Varina, NC (US); Ted Elliott Carpenter, Folsom, CA (US)

(73) Assignee: WHO'S CALLING HOLDING CORP., Houston, TX (US)

( * ) Notice: Subject to any disclaimer, the term of this patent is extended or adjusted under 35 U.S.C. 154(b) by 2361 days.

(21) Appl. No.: 11/291,518

(22) Filed: Nov. 30, 2005

(65) Prior Publication Data

US 2007/0124288 A1 May 31, 2007

(51) Int. Cl.
*G06F 17/30* (2006.01)
*G06Q 30/02* (2012.01)

(52) U.S. Cl.
CPC .... *G06F 17/30864* (2013.01); *G06F 17/30867* (2013.01); *G06F 17/30876* (2013.01); *G06Q 30/02* (2013.01)

(58) Field of Classification Search
USPC .............................................. 709/245; 707/3
See application file for complete search history.

(56) References Cited

U.S. PATENT DOCUMENTS

| | | | |
|---|---|---|---|
| 5,848,396 A | 12/1998 | Gerace | |
| 5,991,735 A | 11/1999 | Gerace | |
| 6,269,361 B1 | 7/2001 | Davis et al. | |
| 6,470,079 B1 | 10/2002 | Benson | |
| 2002/0191762 A1 | 12/2002 | Benson | |
| 2005/0216341 A1* | 9/2005 | Agarwal et al. | 705/14 |
| 2006/0041550 A1* | 2/2006 | Bennett et al. | 707/5 |

FOREIGN PATENT DOCUMENTS

WO     WO 00/62231     * 10/2000

OTHER PUBLICATIONS

ClickPath Media—Published date: Nov. 27, 2004 http://web.archive.org/web/20041127113308/clickpath.com.*
Offline and on the Phone—Author: Brian Quinton, Published: Sep. 21, 2005 http://multichannelmerchant.com/catalogage/searchline/offline_on_phone/.*

* cited by examiner

*Primary Examiner* — Sulaiman Nooristany
(74) *Attorney, Agent, or Firm* — Adolph Locklar

(57) ABSTRACT

A computer implemented method is provided for tracking user activity across different communication networks; the method comprises receiving by a receiving device accessible on a first network, such as the internet, a request from a requesting network device, for an address on a second network, such as a telephone network or an SMS network; receiving by the receiving device from the requesting network device a combination of one or more attributes indicative of a source, such as an ad campaign, web location or keyword, that can lead a user to send a request for information over the first network; selecting a pool of addresses an addresses that is accessible on the second network; producing an association in a database between the selected address and the received attribute; and sending the selected address to the requesting network device over the first network.

24 Claims, 8 Drawing Sheets

A pool of 9 addresses is assigned to AdOutlet Partner5: ~14

| Row | Address | AdOutlet | Keyword | AttributeX | LastIssuedDT |
|---|---|---|---|---|---|
| 1 | 8005556666 | Partner5 | ProductA | Group1 | 2005-01-03 12:17:03pm |
| 2 | 8005552222 | Partner5 | ProductE | Group3 | 2005-01-05 10:01:53pm |
| 3 | 8005553333 | Partner5 | ProductC | Group1 | 2005-01-05 11:32:22pm |
| 4 | 8005558888 | Partner5 | ServiceX | Group8 | 2005-01-06 7:30:58am |
| 5 | 8005551111 | Partner5 | ProductB | Group1 | 2005-01-06 9:17:53am |
| 6 | 8005559999 | Partner5 | ServiceM | Group8 | 2005-01-06 3:49:33pm |
| 7 | 8005554444 | Partner5 | ProductJ | Group3 | 2005-01-06 3:54:20pm |
| 8 | 8005555555 | Partner5 | ProductZ | Group3 | 2005-01-06 8:51:01pm |
| 9 | 8005557777 | Partner5 | ServiceF | Group12 | 2005-01-07 8:10:17am |

At 2005-01-07 2:07:50pm, a request for an address arrives:

| ? | ? | Partner5 | ServiceX | Group8 | /122/222 |

Since an address is already assigned to this attribute combination, 8005558888 would be selected.
For example, if a Longest Since Issued algorithm were used for reassignment, 8005558888 would be moved to the bottom of the list:

~121

| Row | Address | AdOutlet | Keyword | AttributeX | LastIssuedDT |
|---|---|---|---|---|---|
| 1 | 8005556666 | Partner5 | ProductA | Group1 | 2005-01-03 12:17:03pm |
| 2 | 8005552222 | Partner5 | ProductE | Group3 | 2005-01-05 10:01:53pm |
| 3 | 8005553333 | Partner5 | ProductC | Group1 | 2005-01-05 11:32:22pm |
| 4 | 8005551111 | Partner5 | ProductB | Group1 | 2005-01-06 9:17:53am |
| 5 | 8005559999 | Partner5 | ServiceM | Group8 | 2005-01-06 3:49:33pm |
| 6 | 8005554444 | Partner5 | ProductJ | Group3 | 2005-01-06 3:54:20pm |
| 7 | 8005555555 | Partner5 | ProductZ | Group3 | 2005-01-06 8:51:01pm |
| 8 | 8005557777 | Partner5 | ServiceF | Group12 | 2005-01-07 8:10:17am |
| 9 | 8005558888 | Partner5 | ServiceX | Group8 | 2005-01-07 2:07:50pm |

Figure 4C

A pool of 9 addresses is assigned to AdOutlet Partner5:

| Row | Address | AdOutlet | Keyword | AttributeX | LastIssuedDT |
|---|---|---|---|---|---|
| 1 | 8005558666 | Partner5 | ProductA | Group1 | 2005-01-03 12:17:03pm |
| 2 | 8005552222 | Partner5 | ProductE | Group3 | 2005-01-05 10:01:53pm |
| 3 | 8005553333 | Partner5 | ProductC | Group1 | 2005-01-05 11:32:22pm |
| 4 | 8005558888 | Partner5 | ServiceX | Group8 | 2005-01-06 7:30:58am |
| 5 | 8005551111 | Partner5 | ProductB | Group1 | 2005-01-06 9:17:53am |
| 6 | 8005559999 | Partner5 | ServiceM | Group8 | 2005-01-06 3:49:33pm |
| 7 | 8005554444 | Partner5 | ProductJ | Group3 | 2005-01-06 3:54:20pm |
| 8 | 8005556555 | Partner5 | ProductZ | Group3 | 2005-01-06 6:51:01pm |
| 9 | 8005557777 | Partner5 | ServiceF | Group12 | 2005-01-07 8:10:17am |

At 2005-01-07 2:07:50pm, a request for an address arrives:

| ? | ? | Partner5 | ProductG | Group5 |

For example, if Longest Since Issued were the algorithm for reassignment,
8005556666 would be selected for reassignment and moved to the bottom of the list:

| Row | Address | AdOutlet | Keyword | AttributeX | LastIssuedDT |
|---|---|---|---|---|---|
| 1 | 8005552222 | Partner5 | ProductE | Group3 | 2005-01-05 10:01:53pm |
| 2 | 8005553333 | Partner5 | ProductC | Group1 | 2005-01-05 11:32:22pm |
| 3 | 8005558888 | Partner5 | ServiceX | Group8 | 2005-01-06 7:30:58am |
| 4 | 8005551111 | Partner5 | ProductB | Group1 | 2005-01-06 9:17:53am |
| 5 | 8005559999 | Partner5 | ServiceM | Group8 | 2005-01-06 3:49:33pm |
| 6 | 8005554444 | Partner5 | ProductJ | Group3 | 2005-01-06 3:54:20pm |
| 7 | 8005555555 | Partner5 | ProductZ | Group3 | 2005-01-06 6:51:01pm |
| 8 | 8005557777 | Partner5 | ServiceF | Group12 | 2005-01-07 8:10:17am |
| 9 | 8005556666 | Partner5 | ProductG | Group5 | 2005-01-07 2:07:50pm |

Figure 5C

METHOD AND SYSTEM FOR TRACKING ONLINE PROMOTIONAL SOURCE TO OFFLINE ACTIVITY

BACKGROUND OF THE INVENTION

1. Field of the Invention

The invention relates in general to tracking the effectiveness of online promotional activity and, more particularly, to tracking offline activity resulting from online user activity.

2. Description of the Related Art

The internet is a worldwide interconnection of computer networks that has become a global electronic marketplace of goods and services as well as of ideas and information. Millions of computers, from low end personal computers to high end super computers, are connected to the internet. The transformation of the internet into a global marketplace was driven in large part by the introduction of an information system known as the World Wide Web ("the web"). In essence, the web is a distributed database that provides wide access to a large universe of database records in the form of documents known as "pages". These pages reside on web servers and are accessible via the Internet. The web is therefore a vast database of information dispersed across an enormous number of individual computer systems. Computers connected to the internet may access web pages via a program known as a browser, which has a powerful, simple-to-learn graphical user interface. One technique supported by the web browser is known as hyperlinking, which permits web page authors to create links to other web pages which users can then retrieve by using simple point-and-click commands on the web browser.

Web pages may be constructed in any one of a variety of formatting conventions, such as Hyper Text Markup Language (HTML), and may include multimedia information content such as graphics, audio, and moving pictures. Any individual with a computer and a connection to the internet may access any publicly accessible page posted on the web. Thus, a presence on the World Wide Web has the capability to introduce a worldwide base of consumers to businesses, individuals, and institutions seeking to advertise their products and services to potential customers. Furthermore, the ever increasing sophistication in the design of web pages, made possible by increasing data transmission rates and computer processing speeds, makes the web an increasingly attractive medium for advertising and other business purposes, as well as for the free flow of information.

The advent of the internet as a global marketplace has given rise to new advertising techniques such as sponsored links, which for example, may involve a web page provider paying to have a link to its page displayed on a search engine web page in response to certain search requests. By agreeing to pay, the web page provider agrees to "sponsor" a link on the search engine page. One approach to the display of sponsored links involves associating the links to keywords and displaying a sponsored link in response to a search request that includes a keyword associated with the link. Typically, sponsored links are displayed in a prioritized order determined by the amount that a link sponsor has agreed to pay for such display in response to specific keyword search terms.

Pay-per-click is an example of one approach to payment for link sponsorship. Basically, a link sponsor agrees to pay an agreed upon amount for each click on a sponsored link by a visitor to the search engine site. Link sponsors who agree to pay more per click have their links placed in higher priority positions relative to other links who agree to pay less per click. One approach involves displaying sponsored links as a list in which higher paying sponsored links are positioned higher in the list.

Competitive bid auctioning has become a primary means to determine the price per click that sponsors agree to pay for sponsored link placement on a search engine web page, for example. One approach to competitive bid auctioning, for example, involves a prospective sponsor submitting a bid as to the amount per click it is willing to pay to have a hyperlink to its web site displayed on a search engine web page in response to a web visitor search request that includes a designated keyword. Sponsors in essence bid for keywords.

As a result, determining the value of individual keywords has become increasingly important The effectiveness of an advertising campaign involving sponsored links may depend upon high priority placement of a sponsored link in response to keywords likely to be used in a web visitor search request aimed at locating a source of products or services offered by the sponsor. The complex, competitive and real-time nature of bid auction-based key word search business models has increased the urgency for measuring which keywords actually result in conversions or profits to the link sponsor. A sponsor may bid on tens of thousands of key words in the course of an advertising campaign. The price per click resulting from this bidding process can vary greatly due to market forces.

Online advertising, such as pay-per-click sponsored links, is purchased with the intent of attracting web page visitors to a marketer's web site and causing that visitor to take some action of economic value to the marketer. That action or conversion could consist of a web page visitor filling out a lead form, purchasing a good or service from an online shopping cart, or taking some offline action such as placing a phone call or visiting a real world (not online) retail outlet store. The goal of the online marketer is to optimize its advertising campaigns to generate the maximum return on its ad spend. In order to optimize campaigns the marketer needs some way to measure the effectiveness of its advertising in generating conversions. By measuring the return on ad spend (ROAS) for each campaign, an advertiser can cut, increase or re-focus spending appropriately to maximize ROAS.

Currently, there are various solutions on the market that measure online conversions resulting from different types of online advertisement including key-word-level measurements. While these tools generally work well for marketers seeking only online conversions, there has been a need for improvement in measurement of offline responses such as phone calls resulting from online ads. More particularly, previous methods have been tried for tracing in-bound calls back to an originating online advertisement, but these have fallen short of providing a viable cost-effective solution for maximizing ROAS.

For example, in the past advertisers have attempted using dedicated landing pages with static tracked phone numbers to track visitors that call after clicking through from an ad. A problem with this method is that a separate landing page may be required per advertisement, which, in the case of search keywords can be in the tens of thousands or more. If the user clicks away from the landing page then the tracked phone number can be lost. Other methods have dynamically inserted a static tracked phone number contained in a tracking URL into the browsing session. However, since often there are many more keywords that an advertiser bids on separately than there are tracking phone numbers available to track, this method has proven commercially impractical for keyword-level tracking.

Thus, there has been a need for improved tracking the off-line impact of online promotional activity. The present invention meets this need.

SUMMARY OF THE INVENTION

In one aspect, an embodiment of the invention involves a method of tracking user activity across different communications networks. A receiving device operative on a first network, such as the internet for instance, receives a request for an address accessible on a second network, from a requesting network device operative on the first network. The second network, for example, may be a telephone network or an SMS network. The second address may be a telephone number or an SMS number, for example. The receiving device also receives from the requesting network device an attribute that is indicative of a source that can lead a user to send a request for information over the first network. Such user-requested information may include a web page, for instance. A source may include, for example, one or a combination of an internet search engine, an ordinary web page or an advertisement. Such an ordinary web page may be located through use of a search engine or by entry of the web page's URL into a browser, for example. An attribute may include, for example, one or a combination of a URL, keyword or an advertisement. In one embodiment, in response to the received address request in conjunction with the received attribute, an address accessible on the second network is selected from among a plurality of addresses on the second network. An association is produced in a computer readable medium, between the selected address and the received attribute. The selected address is sent to the requesting network device over the first network.

As used herein, a source that can 'lead' a user to send a request may include prompts such as advertisements or highlighted hyperlinks and/or may include a user's own behaviors such keyword selection, for example. A user may be led to visit an advertiser's web site through advertisements or hyperlinks on an affiliate web site. Also, a user may be led to visit an keyword sponsor's web site by the user's own choice of keywords.

In one embodiment, the requesting device includes a user device, such as a personal computer or a web-enabled cellular telephone, for example. An address (e.g. telephone or SMS number) sent in response to the request may be shown or referenced on a user device screen display. In an alternative embodiment, the requesting device may include a network information provider from which a user device requests information. For example, the network information provider may be a web site associated with a company that advertises on the internet through keyword sponsorship or banner advertisements, and the requested information may be a web page. In such alternative embodiment, the provider may send the address to a user device as part of a web page delivered to the user device.

In another aspect of the invention, a method of tracking user activity across different communications networks is provided that involves sharing of addresses accessible on a second communication network among a plurality of network devices operative on a first communication network. A receiving device operative on a first network receiving requests for addresses on a second network from a plurality of requesting network devices. In one embodiment, each network device may request an address independently of requests by other network devices. In one embodiment, the receiving device receives information concerning attributes information corresponding with each address request. These attributes may be indicative of sources that can lead a user to send a request for information over the first network. As explained above, such user-requested information may include a web page, and a source may include an internet search engine, an ordinary web page or an advertisement. An attribute may include one or more of a URL, keyword or an advertisement. In one embodiment, there is a pool of addresses accessible on the second network that is available for delivery to requesting network devices. Before an address is sent to a requesting device in response to an address request, the address is associated in computer readable medium, with one or more attributes sent by the requesting device to which the address is sent. Since there may be more attribute combinations than there are addresses available to be sent, addresses are recycled or rotated. In other words, an address may be associated with one attribute combination for a time and later be reassigned to a different attribute combination.

In one embodiment, rotating addresses includes selecting an address to be associated with a different attribute than that address had been associated with previously. In one embodiment, the selection may be based upon multiple criteria. One possible criterion is recentness within which the address was assigned to a previous attribute association. According to this criterion, less recently assigned addresses are reassigned before more recently assigned addresses. Another possible criterion is recentness within which an address has been sent to a respective network device over the first network. Under this criterion, addresses that were more recently sent are less likely to be reassigned. Yet another possible criterion is frequency within which the address has been assigned to the previous attribute association. According to this criterion, addresses that are sent with greater frequency to requesting devices while still associated with the same previous attribute are less likely to be reassigned to new attributes.

In yet another aspect of the invention a system is provide for tracking user activity across different communication networks. First computer program code is encoded in first computer readable media associated with a first network device operative on a first network. The first computer program code causes the first network device to send a request over the first network for an address accessible on a second network. The first computer program code also causes the first network device to send over the first network an attribute that is indicative of a source that can lead a user to send a request for information over the first network. As stated above, such user-requested information may include a web page, and a source may include an internet search engine, an ordinary web page or an advertisement. An attribute may include one or more of a URL, keyword or an advertisement. A database is provided that includes a plurality of associations between respective addresses accessible on the second network and respective attributes. Second computer program code is encoded in second computer readable media associated with a second device accessible over the first network. The second computer program code, in response to a request for an address on the second network sent in conjunction with a corresponding attribute, causes the second device to change an association of an address in the database from an association with a prior attribute to an association with the attribute sent over the first network. The second computer program code further causes the second network device to send the address for which such changed association has been made, to a requesting first network device over the first network.

In still another aspect of the invention, a system is provided for tracking user activity across different communication networks by sharing addresses accessible on a second communication network among a plurality of network devices operable on a first communication network. First computer program code encodes respective computer readable media associated with respective first network devices operable on the first network. The first computer code causes the first network devices to send requests for addresses accessible on the second network, and also to send corresponding attributes indicative of sources that can lead a user to send a request for information over the first network. A database is provided that includes a plurality of associations between respective addresses accessible on the second network and respective combinations of one or more attributes. Second computer program code encodes computer readable media associated with a second device accessible via the first network. The second computer program code, in response to the address requests and corresponding attributes, causes the second device to change respective associations in the database between respective addresses and respective attributes, and also to send addresses for which such changed associations have been made, to requesting first network devices.

In one aspect of the invention an association stored in an association database between an address on the second network and an attribute combination received over the first network can be used to associate a subsequent communication on the second network with a source leading a user to make a request for information over the first network. More specifically, for example an address on the second network, such as a phone call or SMS transmission, to which a communication is directed may used to identify an attribute in an address/attribute association in the database. The attribute in turn may be indicative of a source that can lead a user to request information over the first network. For example, the attribute may include a URL, keyword or an advertisement leading a user to visit a web site associated with a sponsor, promoter or advertiser.

These and other features and advantages of the invention will be appreciated from the following detailed description of embodiments thereof in conjunction with the appended drawings in which:

BRIEF DESCRIPTION OF THE DRAWINGS

FIGS. 4A-4C are illustrative drawings depicting an example of functions of an address assignment process in accordance with an embodiment of the invention when an address database of FIGS. 1-2 already contains a record having an address associated with an attribute combination for which a new request for an address assignment has been received.

FIGS. 5A-5C are illustrative drawings depicting an example of functions of an address assignment process in accordance with an embodiment of the invention when an address database of FIGS. 1-2 does not contain a record having an address associated with an attribute combination for which a new request for an address assignment has been received.

DETAILED DESCRIPTION OF THE PREFERRED EMBODIMENTS

The following description is presented to enable any person skilled in the art to make and use the system and related method for tracking online network user activity and for tracking offline activity resulting from online user activity in accordance with the embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
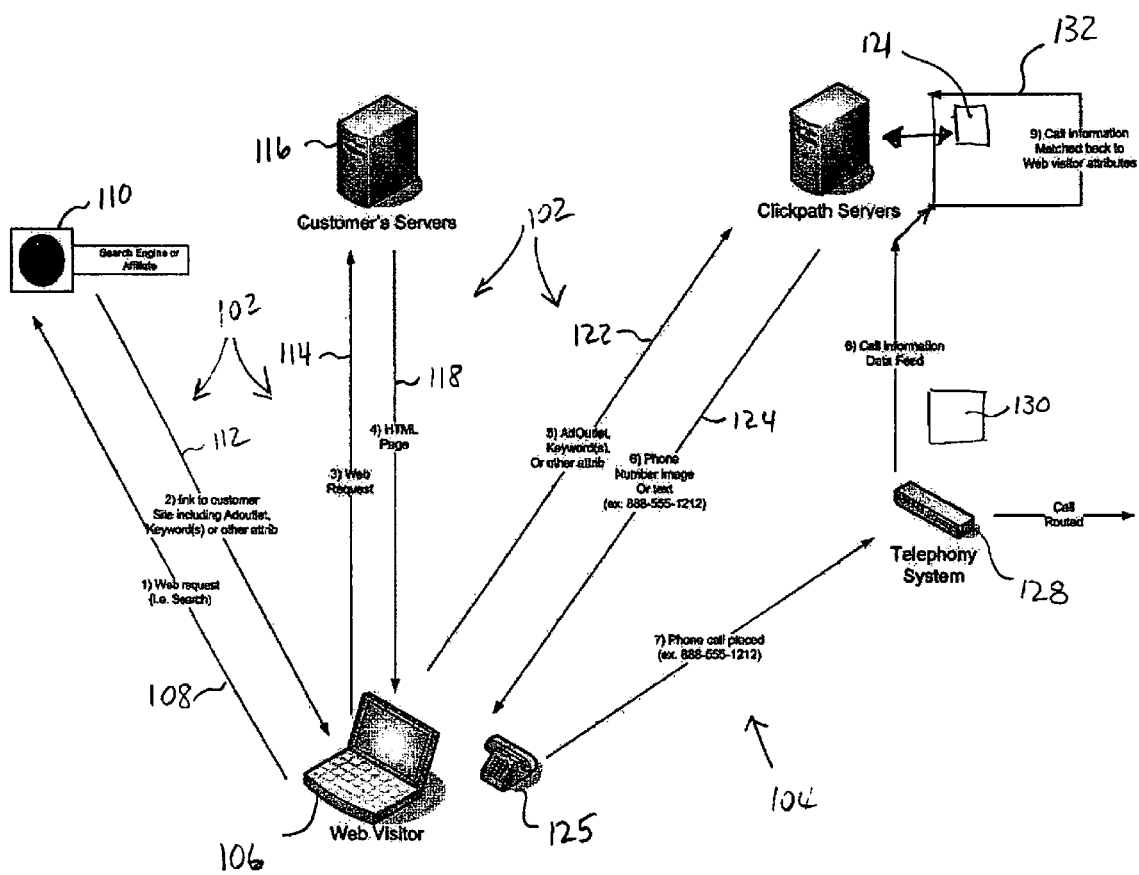
FIG. 1 is a block diagram level drawing illustrating a distributed system in accordance with one embodiment of the invention for tracking user activity on a first network to user activity on a second network.

FIG. 1 is a block diagram level drawing illustrating a distributed system 100 in accordance with one embodiment of the invention for tracking user activity on a first network 102 to user activity on a second network 104. The distributed system 100 is configured as client/server architecture. In one embodiment of the invention, the first network 102 comprises the internet. However, it should be understood that the first network 102 may comprise any of a number of different types of networks that interconnect clients and servers, such as local area networks (LANs), other wide area networks (WANs), and regional networks accessed over physical telephone lines, such as commercial information services.

More generally speaking, a "client" is a member of a class or group that uses the services of another class or group to which it is unrelated. In the context of a computer network, such as the internet, a client is a process (i.e. roughly a program or task) that requests a service which is provided by another process, known as a server program. Typically, a client process uses a requested service without having to know working details about the other server program or the server itself. Ordinarily, in networked systems, a client process runs on a computer or other networked device that accesses shared network resources provided by another computer or networked device running a corresponding server process. Conversely, a "server" is typically a remote computer system that is accessible over a network communications medium such as the internet. However, it should also be noted that it is possible for the client process and the server process to run on the same computer. In some embodiments, a client process may be active on a device in communication with a computer network, and may communicate with a server process over a communications medium that allows multiple clients to take advantage of the information-gathering capabilities of the server. Thus, for example, a server essentially may act as an information provider for multiple client devices operating in a computer network.

Referring again to FIG. 1, in operation in the illustrated example, a client device 106, such as a networked personal computer, cell phone, PDA, mobile audio player, video game console, cable or satellite receiver, IP set-top box, blackberry, or a device capable of connecting to the internet, sends a search request 108 over the first network 102 to a search engine server 110. More particularly, a web visitor using the client device 106, downloads a search engine web page from the search engine server 110. The visitor enters a search request including one or more keywords into a search field on the downloaded page. The visitor, through the client device 106, then requests the search engine server 110 to search for web pages on the internet that meet the search criteria set forth in the search request. The search engine server 110 responds by delivering a response 112 that includes one or more hyperlinks to one or more web pages that satisfy the search request. The response 112 returned by the search engine server 110 also may include one or more sponsored links to web pages of sponsors who may have paid to have their links displayed in response to the entry of a search request that includes one or more of the keywords entered by a visitor.

More specifically, for example, a typical search engine employs automated search technology that relies in large part on complex, mathematics-based database search algorithms that can select and rank web pages based on multiple criteria such as keyword density and keyword location. The search engine sever 110 generally performs searches based upon keywords. A client device 106 operating on the first network 102 ordinarily will be equipped with a web browser, such as Netscape Navigator, Microsoft's Internet Explorer, or other browser software executing in main memory, while server computers operating in the first network 102 will be equipped with web server software capable of delivering web pages in a common protocol such as hypertext markup language (HTML) to client devices using hypertext transfer protocol (HTTP). A browser program allows users to retrieve a web page from a server on the first network 102 by indicating the network location, or web address, of the web page to be retrieved. Web addresses typically are referred to as Uniform Resource Locators (URLs). The user of client device 106 may input the URL of search engine server 108 to a browser. The browser uses the URL to retrieve a web page of the search engine server 108. Once the search engine web page has been returned to the client device 106 and is visible via the client device display screen, the user may make a search request as described above, for instance, by entering a keyword into a designated field of the search engine web page.

In one embodiment, the search engine server 110 includes in the response 112 both organic (or algorithmic) search results and sponsored link results. Organic results indicate URLs associated with web pages identified by the search engine server 110 based upon database search criteria free of any bias imposed by link sponsorship. Sponsored link results indicate URLs associated with sponsors who have some prior agreement with a provider of the search engine server 110 to display their links in response to search requests including agreed upon keywords, for example. For instance, such prior agreement may arise from a keyword bidding process of the general type described above. In other words, in one embodiment, the search engine server 110 returns at least two categories of search results. An organic search results category typically identifies and ranks web pages meeting search engine search criteria such as their having some level of keyword placement or keyword density of keywords specified in a user search request. A sponsored search results category typically identifies and ranks web pages meeting search engine criteria that include prioritization based upon amount paid for a display of sponsored links in the search results involving agreed upon keywords.

In one embodiment, the search engine server 110 associates a sponsored link with an attribute indicative of a "source". As used herein, a "source" may include an adoutlet, ad campaign, a category or keywords, to name just a few examples. In the case of a sponsored link indicated by a search engine server 110 in response to a user search request, the attributes may include, identity of the search engine and a keyword used in the search request. In one embodiment, the search engine server 110 has programming that automatically associates a sponsored link URL with both an "adoutlet" identifier (i.e. the search engine itself in this example) and a keyword. Thus, the response 112 indicates the sponsored link URL and the adoutlet/keyword combination associated with it. As used herein, an "adoutlet" includes a network information provider, such as a search engine or an affiliate web page, that can deliver an advertiser's URL to a visiting user's client device 106.

The following is an illustrative example of the format of a URL associated with the adoutlet (or source) and the keyword. Assume that in one embodiment if the adoutlet is a site named 'Partner 5 (PTNR5)' and the keyword is 'products services', then the returned URL could be, http://www.somewebsite.com/?cpao=PTNR5&kw=products+services. In this example, 'PTNR5' identifies the search engine, and 'somewebsite.com' identifies a web address associated with a sponsored link selected by the user. Note that the parameters "cpao" and "kw" could be named anything. For example, they could be engine=PTNR5&keyword=products+services. Or they could be, ?adoutlet=PTNR5&query=products+services.

A user may "click" on one of the hyperlinks identified by the search engine server 110 in order to send a request 114 to a network information provider server 116, for a web page designated by a URL associated with the clicked hyperlink. It will be appreciated that the network information provider server 116 in this example embodiment is associated with an advertiser or promoter interested in tracking online promotional activities to off line activities, i.e. tracking activtiy on the first network 102 to activity on the second network 104. The designated server 116 sends an information response 118 in the form of a web page. It will be appreciated that a web page may include data records, plain textual information, or more complex digitally encoded multimedia content, such as software programs, graphics, audio signals, videos, and so forth. Although in one embodiment, client and server computers communicate using Hypertext Transfer Protocol (HTTP), other communications protocols, such as Secure Hypertext Transfer Protocol (HTTPS), FTP, SNMP, TELNET, and a number of other protocols known in the art, may be used.

In one embodiment, the network information provider advertises its site 116 by sponsoring a link on the search engine server 110 may be clicked by the web visitor operating client device 106, resulting in delivery a web page for the provider's site 116 . As explained above, an advertiser is likely to be quite motivated to keep track of how successfully its advertising dollars are being spent. An advertiser may be especially interested in knowing which adoutlets and which keywords are most effective in producing sales, for example.

More generally, search engine link sponsorship is not the only avenue for using a computer network such as the internet to promote sales, for example. For example, a link may be associated with an advertisement on an affiliate's web page. A user may click on such an ad to hyperlink to the advertiser's web page. Such an advertisement link also may be associated with attributes such as an attribute identifying the affiliate (i.e., the adoutlet) and attribute identifying the advertisement, campaign, keywords, categories, etc. Tracking of such attribute information can be used to assess the success of an advertising campaign by permitting an advertiser or link sponsor to track economic activity, such as the purchase of goods or services, back to the adoutlet and keyword that stimulated that activity.

Another approach to promoting sales involves the use of organic search results. An advertiser may reach an agreement with an affiliate to include an indication of the advertiser's web site on the affiliate's web site (not shown). The affiliate's web site may be an ordinary web site in that it is not primarily a search engine web site. The indication may include a hyperlink to the advertiser's web site, for example. For instance, the advertiser may believe that the affiliate's web site has a relatively high probability of garnering a high priority listing in a search engine's organic search results category in response to keywords the advertiser believes to be indicative of a visitor's potential interest in the advertiser's goods or services. In fact, the affiliate's web site may be specifically designed so that it is more likely to garner a relatively high priority organic listing in response to certain selected keywords.

Alternatively, for example, the affiliate web site may be a well known web site (not shown) believed to attract a category or class of web visitors that the advertiser wishes to reach. In that case, a web visitor might not even use a search engine to locate and visit the affiliate web site. Instead, the visitor might enter the affiliate web address (e.g. URL) directly into the address field of a browser on the client device 106 in order to guide the browser directly to the affiliate site without the need to involve a search engine.

In either case, once a visitor's browser displays the web page associated with such affiliate, the visitor may click on a hyperlink that the affiliate has agreed to place on its web site in order to be re-directed to a different web site associated with the advertiser. The hyperlink is associated with a URL for the advertiser's web site and also may be associated with an attribute that identifies the affiliate. In some cases, the link is placed on the affiliate site in multiple places, in which case additional attributes can be used to indicate which placement motivated the reader to click on the hyperlink. For example, a link may be placed on the "Preferred Partners" page and another may be associated with a banner advertisement. Assume that in one embodiment that the affiliate is a site named 'Partner 21 (PTNR21)', then the returned URL could be, http://www.somewebsite.com/?cpao=PTNR21. In this example, 'PTNR21' identifies the affiliated web site, and 'somewebsite.com' identifies the web address associated with advertiser. If an additional parameter were used, an example might be http://www.somewebsite.com/?cpao=PTNR21 &campaign=Banner.

Figure 2:
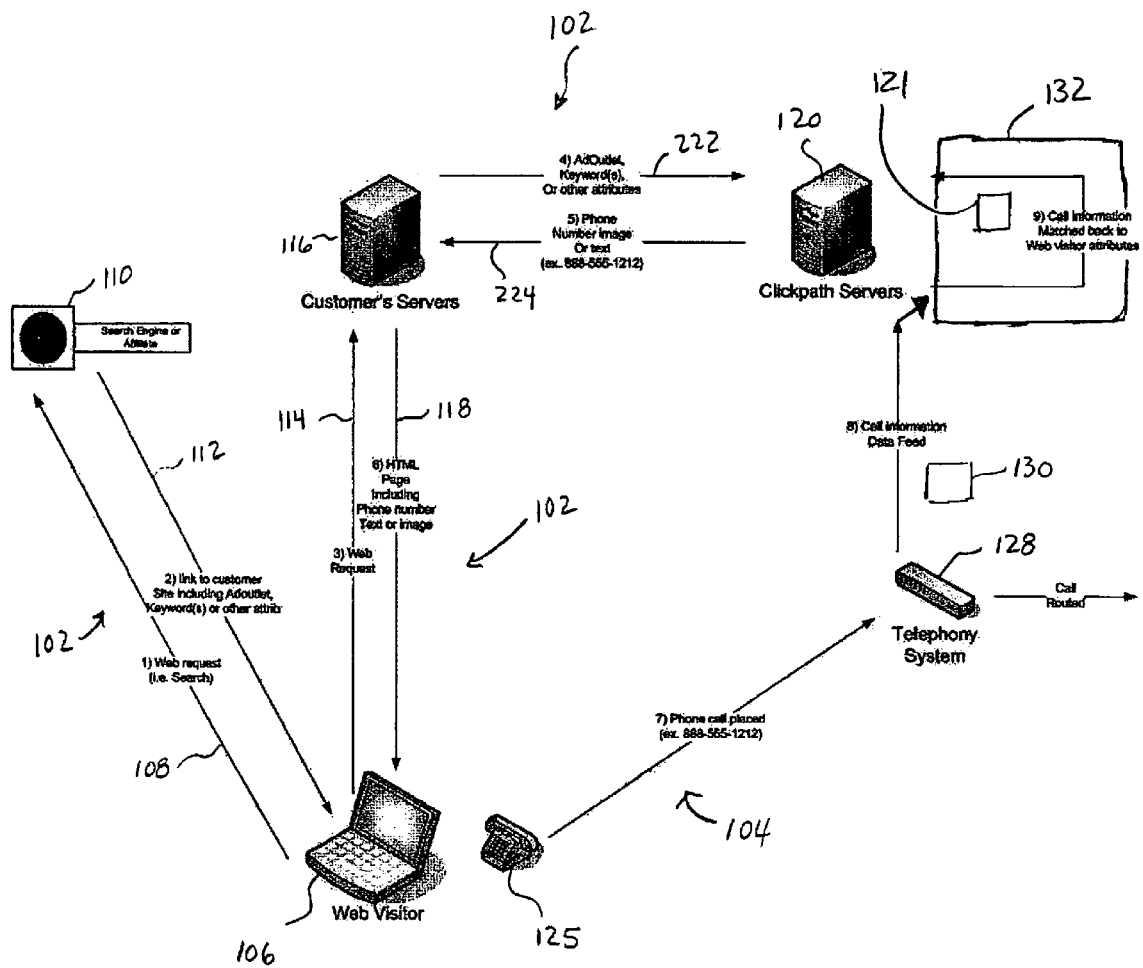
FIG. 2 is a block diagram level drawing illustrating a distributed system in accordance with an alternative embodiment of the invention in tracking user activity on a first network to user activity on a second network.

To briefly summarize, organic search results or direct use of links on affiliate web site constitute an alternative embodiments (not shown), consistent with the principles of the invention. Thus, for example, it will be appreciated that an affiliate web site (not shown) could be substituted into the network location of the search engine server 110 in the diagram of FIGS. 1-2 consistent with the principles of the invention. In other words, a search engine server 110 such as that shown in FIGS. 1-2 is just one example of an affiliate that can be used in conjunction with the invention. As one alternative, for example, organic search results produced by a search engine could be used to locate an affiliate web page, and a web visitor then could select a link (e.g. click a hyperlink) on that page to locate the advertiser's web page. Attribute information could be returned by the affiliate to a user device 106 indicating that the affiliate is the source that identified the advertiser's web page to the visitor. As another alternative, for example, a web visitor could visit an affiliate web page directly, without the aid of a search engine. The web visitor then could select a link on that page to locate the advertiser's web page. Attribute information could be returned by the affiliate to a user device 106 indicating that the affiliate is the source that identified the advertiser's web page to the visitor.

A difficulty in assessing the success of an online advertising effort is that online visitors often choose to follow-up off line. For instance, a web visitor may prefer to make a phone call or to send an SMS message in order to contact the advertiser. Such off line follow up may lead to an actual off line purchase of goods or services or develop into a valuable relationship between advertiser and visitor that may result in a future sale. The challenge is to track a visitor's offline follow-up communication back to the "source". Complicating the challenge is the fact that there may be a huge number of "sources" to be tracked.

One solution to this challenge is to dynamically assign an identifying address for use on an alternative off line network likely to be used by the visitor and to display the assigned address on the web page retrieved by the visitor. The assigned address is associated with an attribute combination representing the "source" identifying information. If the visitor later initiates communication using the assigned address, the address can be used to match back to the identifying attributes. By assigning addresses dynamically, addresses can be reassigned among different attribute combinations permitting a limited number of selectable addresses to be dynamically shared among a large number of attribute combinations.

Accordingly, a web page returned by the network information provider 116 in accordance with one embodiment of the invention includes a field, area, or region of a user interface screen used to display a dynamically selected address for use in making requests to an address location on the second (i.e., alternative) network 104. The second network 104 may comprise a telephone network in which case the displayed address may be a telephone number. Alternatively, for example, the second network 104 may comprise an SMS or MMS network, in which case the displayed address may include a 10 digit SMS or MMS address or a 5 Digit Common Short Code (CSC). The second network 104 may share physical resources with the first network 102. For example, a media gateway may provide a communication pathway between an IP network operable over the internet and the PSTN.

Thus, in one embodiment, a web page delivered to the client device 106 by the network information provider server 116 over the first network 102 includes a dynamically assignable address on the second network 104 that a user may use to respond to solicitations or offers made on the web page. For example, the web page may offer merchandise for sale online or may request that a consumer to fill in an online form. However, a consumer may prefer to make a telephone call over the second network 104 to place orders or to share personal information.

An address server 120 dynamically selects an address to be displayed on the web page delivered to the client device 106. In one embodiment, there are far fewer address locations (e.g., telephone numbers) in the second network 104 available for dynamic assignment by the address server 120 than there are possible attribute combinations to be tracked. For example, there may be thousands of keywords and adoutlet/keyword combinations that possibly could be of interest and a far lesser number of telephone numbers available for association with individual keywords or with adoutlet/keyword combinations. Thus, addresses are assigned to keywords dynamically based upon prescribed assignment criteria. In other words, addresses typically are not permanently associated with keywords, search terms, adoutlets, network information providers or other attributes, but rather may be reassigned based upon assignment criteria such as keyword/adoutlet attribute combinations.

In the embodiment of FIG. 1, the client device 106 makes an address request 122 over the first network 102 to the address server 120. The address server 120, for example, may provide a telephone number or an SMS address to be displayed on the web page returned by the designated network information provider 116 to the client device 106. More specifically, for example, in one embodiment, attributes such as identity of the network information provider 116 (e.g., its URL), adoutlet, keyword and/or other attributes are gathered via a client side script that is loaded and executed on a browser running on the client device 106. This script may be javascript, jscript, vbscript or other client side scripting language, which may be loaded from the network information provider's web server 116 or from a third party web server (not shown). In other words, in one embodiment, the network information provider server 116 provides a web page with a field or region designated to display a dynamically assignable address (e.g., telephone or SMS number) accessible on a second network and also provides a software script used to retrieve a dynamically assigned address from the address server 120. The script then utilizes these attributes to assemble a request 122 over the first network 102 for identification of an address on the second network 104. In one embodiment, the address server 120 dynamically assigns a telephone number according to an address selection process described below with reference to FIG. 3, and sends a response 124 including the assigned address, such as a telephone number or SMS address, to the device 106 over the first network 102.

Moreover, in addition to returning an assigned address such as a phone number, the address server 120 also may return what has been termed, an implied 'call to action'. A call to action in internet advertising parlance involves words that urge a web visitor to take some action based on the context of keywords used in a search and/or a web visitor's behavior on a web site. For example, if a web visitor entered the search request, "credit card processing machine", on the search engine server 110, and then clicked on a sponsored link for a merchant services web set, the address server 120 could dynamically select the following for display on the web page of the network information provider 116:

"Call 8xx-xxx-xxxx Now for Info on <Credit Card Machines>"

or

"Call 8xx-xxx-xxxx Now for help selecting <Credit Card Machines>"

The address server 120 produces a record 119 in a database 121 that associates the assigned address with attributes associated with an address request 122 that prompted its selection. The following Table 1 provides an example of some illustrative records that associate assigned addresses with reported attributes.

TABLE 1

| ADDRESS | ADOUTLET | KEYWORD | CAMPAIGN |
| --- | --- | --- | --- |
| 8xxxxxxx1 | PTNR5 | Credit Card Machines | Products |
| 8xxxxxxx2 | PTNR5 | Scanners | Products |
| 8xxxxxxx3 | PTNR5 | Word Processor | Software |

The selected address (e.g., telephone number or SMS address) that is returned by the address server 120 is stored in a variable or other storage location on the client device 106. A display of the returned address 124 may be rendered on the HTML page sent by the network information provider server 116, using a method such as javascript "document.write", for example.

Subsequently, a user of a second device 125 coupled to the second network 104 may establish communication with a target device 128 associated with the selected address. More specifically, for example, if the second network 104 comprises the telephone network, then the second device 125 may comprise a telephone, and the target device 128 may be a telephone call center, a telephony switch or an interactive voice response (IVR) system used to receive orders or answer questions. Alternatively, for example, if the second network 104 comprises an SMS network, then the second device may comprise a mobile or cellular phone that is used to send an SMS text Message or MMS message, and target device 128 may be a Short Messaging Service Center (SMSC), SMS Gateway, or other type of SMS or MMS tracking or transaction server used to receive or route messages.

A report 130 is generated by a person or system monitoring usage of the second network 104. The report is delivered to a matching system 132 in response to a communication received over the second network 104 by a target device 128 associated with the selected address. For instance, the report may be produced automatically when a telephone call using a dynamically assigned number is received by a call center used by the business interested in tracking off line responses to online promotional efforts. The precise manner in which such reports are generated forms no part of the present invention and persons of ordinary skill in the art will be able to readily produces such reports without undue effort. The following Table 2 provides an illustrative example of two reports of several example communications.

TABLE 2

| ADDRESS | DATE/TIME | DURATION | CALLER |
| --- | --- | --- | --- |
| 8xxxxxxx1 | Jan. 13, 2005 1:03:23 pm | 129 s. | 919555xxxx |
| 8xxxxxxx2 | Jan. 13, 2005 1:05:02 pm | 432 s. | 617555xxxx |

The report identifies the address on the second network 104 used to initiate communication and the date/time of the communication. The address identity (e.g. the "dialed" address in the ADDRESS column above and not the CALLER address which is optional and not necessary for matching process.) plus date/time are used to match the communication over the second network 104 to the attributes that were associated with the assigned address in response to activity on the first network 102. For example, the record associated with the called assigned address may include an adoutlet/keyword combination. Thus, a communication on the second network 104 using the assigned address identified in the report can be used to associate offline activity with attributes, such as adoutlet/keyword combinations, indicative of specific online advertising activity.

However, addresses are assigned dynamically, and an address may be associated with different attributes. Date/time information associated with a communication over the second network 104 using a dynamically re-assignable address may be used to ascertain what attributes to associate with the communication. Also, for example, the report may provide additional information such as call duration, shown in Table 2 above, caller address information derived from the phone number, outcome or disposition information entered for the call either via the telephone or entered after the call has ended via some other interface. The report 130 is delivered via a network protocol such as (but not limited to) HTTP, HTTPS, FTP, or via a physical file delivered electronically or by storage medium.

In one embodiment, a matching process 132 described below with reference to FIG. 4, matches an address (e.g., telephone number) in a report 130 to an address/attribute combination in the database 121. The matching is used to associate a communication over the second network 104 with one or more attributes, such as a provider/keyword attribute combination. Thus, through such matching process, a network information provider and/or keyword(s) (or other information) can be identified as the ultimate source of a communication on the second network 104.

FIG. 2 is a block diagram level drawing illustrating a distributed system 100' in accordance with an alternative embodiment of the invention for tracking user activity on a first network 102 to user activity on a second network 104. The system of FIG. 2 is much the same as that of FIG. 1, and therefore, only those aspects that are different are described. Moreover, items in FIG. 2 that are substantially the same as items in FIG. 1 are labeled with reference numerals identical to the reference numerals identifying corresponding items in FIG. 1.

In the embodiment of FIG. 2, just as in the embodiment of FIG. 2, a client device 106 sends a web page request 114 to a network information provider 116. The request 114 includes the provider 116's URL as well as attributes, just as it does in the embodiment of FIG. 1. However, in the embodiment of FIG. 2, the network information provider 116 sends an address request 222 over the first network 102 to the address server 120, and the address server 120 returns a response 224 over the first network 102 that includes an assigned address for use on the second network 104. The provider 116 sends to the client device 106 the requested web page together with the assigned address obtained from the address server 120. Thus, in the embodiment of FIG. 2, the network information provider 116 rather than the client device 106, contacts the address server 120 via the first network 102, to obtain an assigned address for use on the second network 104.

More particularly, for example, in one embodiment, attributes such as identity of the network information provider 116 (e.g., its URL), adoutlet, keyword and/or other attributes are gathered via a server side script running on provider 116. These attributes then may be passed to the address server 120 over the first network 102 or, alternatively, on the same web server via webservice or other comparable API/Interface. The address server 120 assigns an address on the second network 104 based on these attributes and returns the selected address 224 to the network information provider server 116. The assigned second network address then can then be rendered directly into the HTML (web) page 118 to be sent to the client device 106 as the page is constructed. Therefore, in the embodiment of FIG. 2, a network information provider server 116 makes a request to the address server 120 for an address to be included within a web page provided to the user network device 106. The assigned address is included in a web page 118 provided to the client device 106 by the network information provider server 116.

Although the illustrations of FIGS. 1-2 show separate devices used for communication over the first network 102 and the second network 104, a single device (not shown) can be used for communications over both networks consistent with the principles of the invention. For example, a user of an internet enabled cellular telephone may conduct a keyword search over the internet, i.e. the first network 102, resulting in indications of one or more telephone numbers (or SMS numbers) appearing on his or her device screen display. Alternatively, for example, an internet advertisement may appear on an internet enabled telephone's display, and the advertisement may be associated with an indication of a phone (or SMS) number. An "indication" may be an icon, link, phone number or button used to make a call, but which does not necessarily display the number (i.e., address) called, for example. The cell phone user may select, e.g., click on, such indication to initiate a call over the phone (or SMS) network, i.e. over the second network 104.

Figure 3:
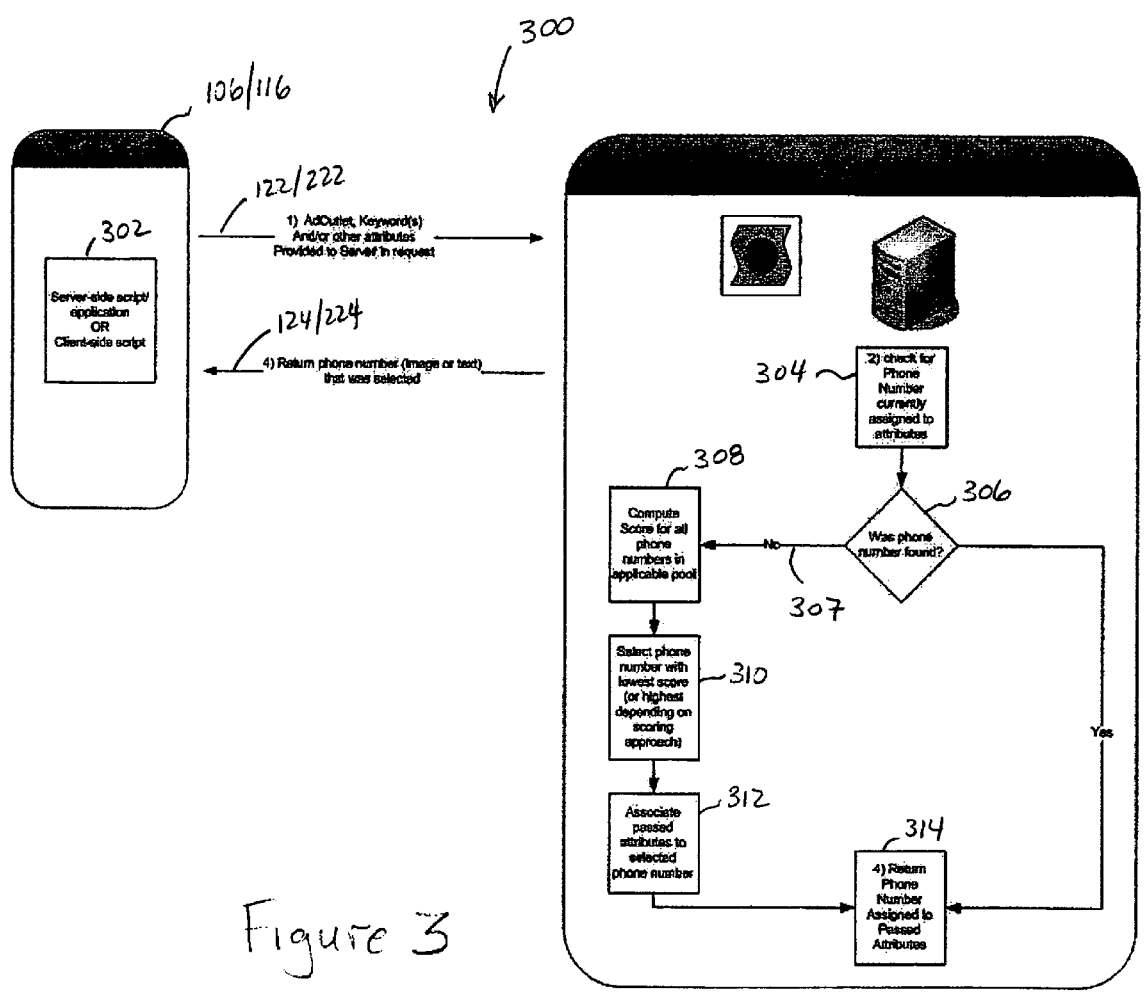
FIG. 3 is an illustrative flow diagram of an address selection process in accordance with an embodiment of the invention.

FIG. 3 is an illustrative flow diagram of an address selection process 300 in accordance with an embodiment of the invention. The process 300, which runs as a computer program on the address server 120, receives an address request 122 or 222 from an address requesting process 302 and returns a selected address 124 or 224 to the address requesting process 302. For example, referring to FIG. 1 and FIG. 3, in one embodiment, the address requesting process 302 may comprise a client-side script running on a client device 106 as part of an HTML page returned by a network information provider server 116 in response to a user request 114. Alternatively, referring to FIG. 2 and FIG. 3, in another embodiment, the address requesting process 302 may comprise a server-side script or application running on a network information provider server 116.

One aspect of the selection process involves assignment of an address in a situation in which there is a greater number of potential attribute combinations to which addresses may be associated than there are addresses eligible for association with attribute combinations. Attribute information such as identity of the network information provider 116 (e.g., advertiser or promoter), online adoutlet visited by a user, and keyword search term entered by a user in a search request field of the search engine 110, are passed to the address server 120. As described above, such attribute information may be provided via the query string (e.g., with a URL) or may be provided via header or browser settings, for example. In one embodiment, addresses are assigned to an attribute combination comprising a network information provider identifier (e.g., URL) and a keyword.

Since the number of attribute combinations is greater than the number of available addresses, addresses are dynamically re-assigned based upon selection criteria used by the computer program driven selection process 300. In one embodiment, a pool of addresses eligible for re-assignment is first identified. For example, this pool may include a limited pool of addresses allocated to a given network information provider, or a broader pool of addresses eligible for allocation among multiple providers. In operation, the address selection process 300 receives an address request 122 or 222. In step 304, a determination is made as to whether an address already is currently associated with one or more attributes associated with the request. For example, this determination may involve a check of database 121 to determine whether there currently is an association between a provider/keyword attribute combination and an address on the second network 104. If a determination is made in step 304 that there is no address currently associated with the one or more attributes associated with the request, then decision step 306 directs the process along branch 307 to step 308 in which various criteria are evaluated to determine which address, from among a pool of addresses, to associate with the attributes presented in the newly received request.

In one embodiment a weighting process involving scoring is used to select addresses for re-assignment. The weighting process involves assigning points based on several factors. For example, points are assigned to an address based upon the time that has passed since this address has been served/displayed on a client browser. Then points are subtracted based on the number of impressions on which an address has been displayed for a particular attribute. The number of impressions is the number of times an address is rendered into the display. Typically this is done once per client device per page visited. So more client devices for the same combination can increase impressions. Also, more pages visited by a single client device can increase impressions.

The address with the highest score is the one selected for reassignment. The subtraction of impressions increases the likelihood that a high-volume, or frequently occurring, attribute combination retains the same address for a longer period of time. Alternatively, weighting can be applied to increase or decrease the influence of a particular attribute on the overall result. In step 310, an address that has the lowest score (or highest if the scoring approach is reversed) is selected from the prescribed pool. In step 312, the selected address is associated in the database 121 with a received attribute combination. Next, in step 314, the newly assigned address is returned as a response 124 or 224. Alternatively, if a determination is made in step 304 that there is an address currently assigned to the received attribute, then decision step 306 directs the process along branch 309 to step 314, which returns the currently assigned address as a response 124 or 224.

Moreover, one or more of the following factors may be evaluated to determine whether to re-assign an address:

1. recentness of sending the assigned address (i.e., time since address was sent).
2. frequency of sending the assigned address (i.e., number of time address was sent).
3. frequency of changing the association for the assigned address.
4. recentness of a customer communication via the assigned address.
5. frequency of customer communication via the assigned address (i.e., reassignment of addresses that receive few or no communications to different attributes, while keeping addresses assigned to the same attributes for longer if they receive frequent communications).
6. recentness of online activity by a customer who was shown the assigned address. (While typically an address is sent (1 and 2 above) every timethere is online activity, in certain cases an address may not be displayed on every page—in which case, other recent (or frequent for #7) online activity might be reason enough to keep a number assigned to a particular set of attributes.
7. frequency of online activity by a customer who was shown the assigned address (See #6).

An overall objective in selecting an address for reassignment is to reassign addresses that are least likely to get a call. Another overall objective is to generally leave addresses more constant (i.e., reassign them less frequently) for attribute combinations that are likely to get frequent visitors and/or calls. Thus, in accordance with an embodiment of the invention, an address re-assignment process may use criteria, such as those described above, for example, to determine which previously assigned addresses to re-assign.

Not all addresses need be associated at the keyword attribute level. For instance, an address may be assigned to a whole network information provider (e.g., advertiser or promoter), if keyword tracking is not wanted or needed on that particular provider, in which case, the same address is displayed for any client/visitor to that provider, regardless of keyword. Optionally, no address may be assigned to specific providers—allowing a default phone address to be used in certain cases where tracking is not desired. However, if addresses are to be associated at the keyword level, then it may be advantageous to assign different addresses to different attribute combinations.

Furthermore, for example, addresses may be assigned based, at least in part, upon groupings of attributes such as advertising sources and/or keywords. For example, individual movie titles might serve as individual keywords, but these could be grouped into groupings by media type (DVD, VHS) and subgroupings by genre (Action, Romance, Comedy, etc.). The selection of these groupings may be in accordance with whatever is meaningful/usefuil to the customer.

Moreover, the address selection process is not limited to selection based upon provider/keyword attribute combinations. For example, suppose the second network 104 includes the phone network, and that it is desirable to track phone calls to a particular HTML page advertisement copy/text and/or color scheme displayed on a client device 106 and the browser type of a client device 106 A phone number such as 800-555-xxxx might be assigned to the attribute combination: ad copy "Last Chance", color "red" and browser "Internet Explorer". All client devices returning these three attributes would see the same phone number 800-555-xxxx displayed on the web page returned by the network information provider 116 . In this example, a client device returning the attribute combination: ad copy "Last Chance", color "red" and using "Netscape"—would be assigned a different phone number. Using the address selection process of FIG. 3, phone numbers could be re-assigned as needed depending on the number of phone numbers available and the number of combinations of these attributes that actually visit the website. Phone calls could then be mapped back to the ad copy, color and browser that were assigned to that phone number at the time of the call.

Other attributes or other criteria also may be collected for use in selecting an address on the second network 104. For example, these attributes may be provided in the URL linked from a provider/affiliate or they may be provided by browser/system settings. For example, one browser setting is language—so a different phone number (one routed to a Spanish-speaking telemarketer) could be displayed for those with their browser language set to Spanish. Other non-advertising criteria also could factor into the address assignment process. For example, if call volume exceeded a certain level, different phone numbers could be displayed to route callers to a secondary call center for overflow. Alternatively, for example, ANI (caller phone number) could be used to identify the caller and route calls to specialists for their group or region.

FIGS. 4A-4C are illustrative drawings depicting an example of functions of an address assignment process in accordance with an embodiment of the invention when an address database 121 of FIGS. 1-2 already contains a record having an address associated with an attribute combination for which a new request 122/222 for an address assignment has been received. Thus, there is no need to assign or to reassign a new address to the received attribute combination. Nevertheless, updating of the database 121 is required.

FIG. 4A is an illustrative drawing of nine records (i.e. one per row) in an address database 121 before updating. Each record in the database represents an association between an address on the second network 102 (e.g. 8005556666 in Row 1) and adoutlet, keyword and attributex attributes (e.g. Partner5, ProductA and Group1 in Row 1) and the last date/time on which the address was assigned to the attributes set forth in the record (e.g. 2005-01-03 12:17:03 pm in Row 1). FIG. 4B represents receipt by the address server 120 of a request 122/222 for an address assignment to the following attribute combination: Partner5+ServiceX+Group8. In this example, the request 122/222 is received at date/time 2005-01-07 2:07:50 pm. FIG. 4C is an illustrative drawing of nine records in the address database 121 after updating of the database in response to the request illustrated in FIG. 4B.

In this example, the attribute combination of the new request 122/222 matches the attribute combination of the record of Row 4 of the database 121 shown in FIG. 4A. Thus, the address assignment process does not assign a new address to the newly received attribute combination, Partner5+ServiceX+Group8. Rather, the address assignment process merely updates the LastIssuedD/T field of the record to indicate the date/time of receipt of the request in FIG. 4B, 2005-01-07 2:07:50 pm. Moreover, in this example, records are ordered in the database 121 from least recently updated (top) to most recently updated (bottom). Thus, the record containing the new most recent Date/Time update is shown in FIG. 4C to have been moved to the last row, Row 8, and the records of Rows 5-9 in FIG. 4A are shown to have been shifted up one row in FIG. 4C. It will be appreciated that the entry of this new more recent date/time information may influence the priority with which the address assignment process of FIG. 3 will reassign the address (i.e. 8005558888) associated with the attribute combination of FIG. 4B. The re-ordering of the rows represents this reprioritization.

FIGS. 5A-5C are illustrative drawings depicting an example of functions of an address assignment process in accordance with an embodiment of the invention when an address database 121 of FIGS. 1-2 does not contain a record having an address associated with an attribute combination for which a new request 122/222 for an address assignment has been received. Therefore, assignment of an address to correspond to the received attribute combination is required. Since there are a limited number of addresses available for assignment, and for the purposes of this example, it is assumed that all addresses have been assigned previously; the address reassignment process reassigns one of the previously assigned addresses to correspond to the newly received attribute combination.

FIG. 5A is an illustrative drawing of nine records (i.e. one per row) in an address database 121 before updating. FIG. 5B represents receipt by the address server 120 of a request 122/222 for an address assignment for the following attribute combination: Partner5+ProductG+Group5. In this example, the request 122/222 is received at date/time 2005-01-07 2:07:50 pm. FIG. 5C is an illustrative drawing of eight records in the address database 121 after updating of the database in response to the request illustrated in FIG. 5B.

In this next example, the attribute combination of the new request 122/222 shown in FIG. 5B does not match the attribute combination of any current record of the database 121 shown of FIG. 5A. Thus, the address assignment process of FIG. 3 assigns an address to the newly received attribute combination, Partner5+ProductG+Group5. In this example, all of the available addresses (nine of them) already have been assigned to attributes. Therefore, the address assignment process must select one of the previously assigned addresses for reassignment to the new attribute combination shown in FIG. 5B. Specifically, the address assignment process reassigns the address of the least recently updated record, 8005556666 in Row 1 of FIG. 5A, to the new attribute combination, Partners+ProductG+Group5. As explained above, in this example, records are ordered in the database 121 from least recently updated (top) to most recently updated (bottom). Thus, the record containing the new most recent Date/Time update is shown in FIG. 5C to have been inserted in the last row, Row 9, and the records of Rows 2-9 in FIG. 5A are shown to have been shifted up by one row each in FIG. 5C. As explained above, the re-ordering of the rows represents a reprioritization of the priority with which the address reassignment process will reassign the addresses.

Figure 6:
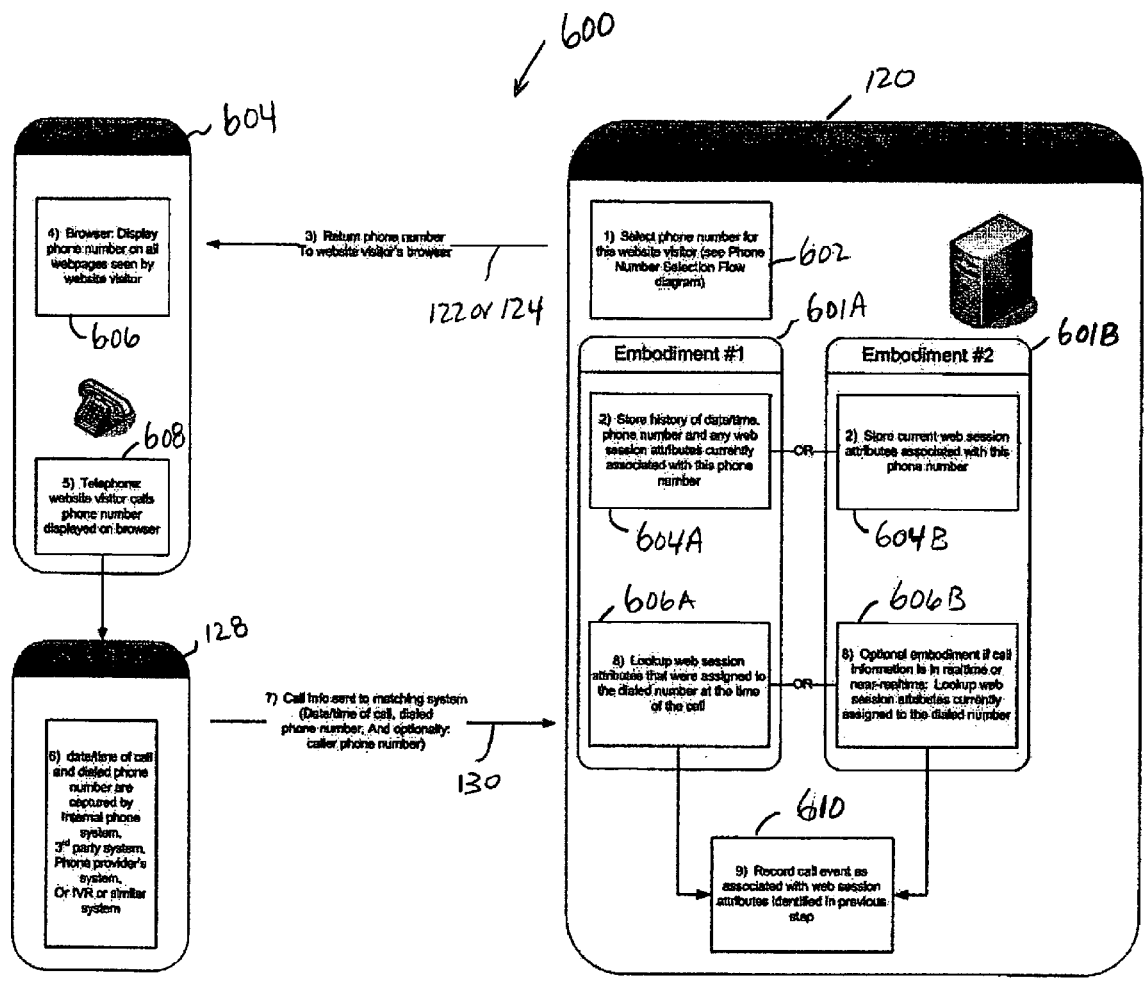
FIG. 6 is an illustrative flow diagram of a call matching process used to match a communication with a target device at a selected address on a second network with one or more attributes that were associated with the selected address based upon a prior request by a client device on the first network.

FIG. 6 is an illustrative flow diagram of a call matching process 600 used to match a communication with a target device 128 at a selected address on the second network 104 with one or more attributes that were previously associated with the selected address based upon a prior request 118 by a client device 106 on the first network 102. In one embodiment, the matching process 600 runs on the address server 120. Step 602 corresponds to the address assignment process of FIGS. 3, 4A-4C and 5A-5C, through which an address in the second network 104 is associated with one or more attributes.

The drawings of FIG. 6 illustrate two slightly different implementations of the address matching process. In a first implementation indicated within block 601A, and a second implementation is indicated within block 601B. Step 604A, within block 601A, involves storing in database 121 a record of an association between an address selected through the address assignment process and a combination of one or more attributes associated with the selected address and a record of the date and time of the address assignment and attribute association. Alternatively step 604B, within block 601B, involves storing in database 121, current web session attributes associated with the selected address.

An assigned address (e.g., telephone or SMS number) is delivered in the previously described response 124 or 224 to the client device 106 where the address is displayed. See illustrative block 604, which represents activities of a website visitor. For instance, block 606 represents the display of a selected address on a web page viewed on a client device 106 by a website visitor. A web page can be returned by the network information provider server 116. Block 608 represents an event in which the visitor uses the selected address to communicate with a target device 128 via the second network 104 (e.g., the telephone network). A record is created, for example, by a third party phone system (PSTN, VOIP, IVR) of the date and time of the communication by the visitor with the target device 128 using the assigned address. A report 130 of the communication event is delivered to server 120. The report includes information such as an identification of the address on the second network 104 used by the visitor to communicate with the target device 128, date and time of the communication and possibly other information.

In response to the report, step 606A, within block 601A, looks up in database 121 the combination of one or more attributes assigned to the identified address at the date and time of the communication. Alternatively, step 606B, within block 601B, looks up web session attributes of a web session that currently is operative. These "web session attribute" are the same provider/keyword (or other attributes) that were stored in relation to this address in step 604A or 604B. Step 606B is simply indicating that in a real-time environment, the time of the request on the second network may be immaterial because the request is implicitly happening "now". In step 610, a record is created (or updated) to indicate the communication event over the second network 104 using an (e.g., phone or SMS number) address associated with a combination of one or more attributes.

Figure 7:
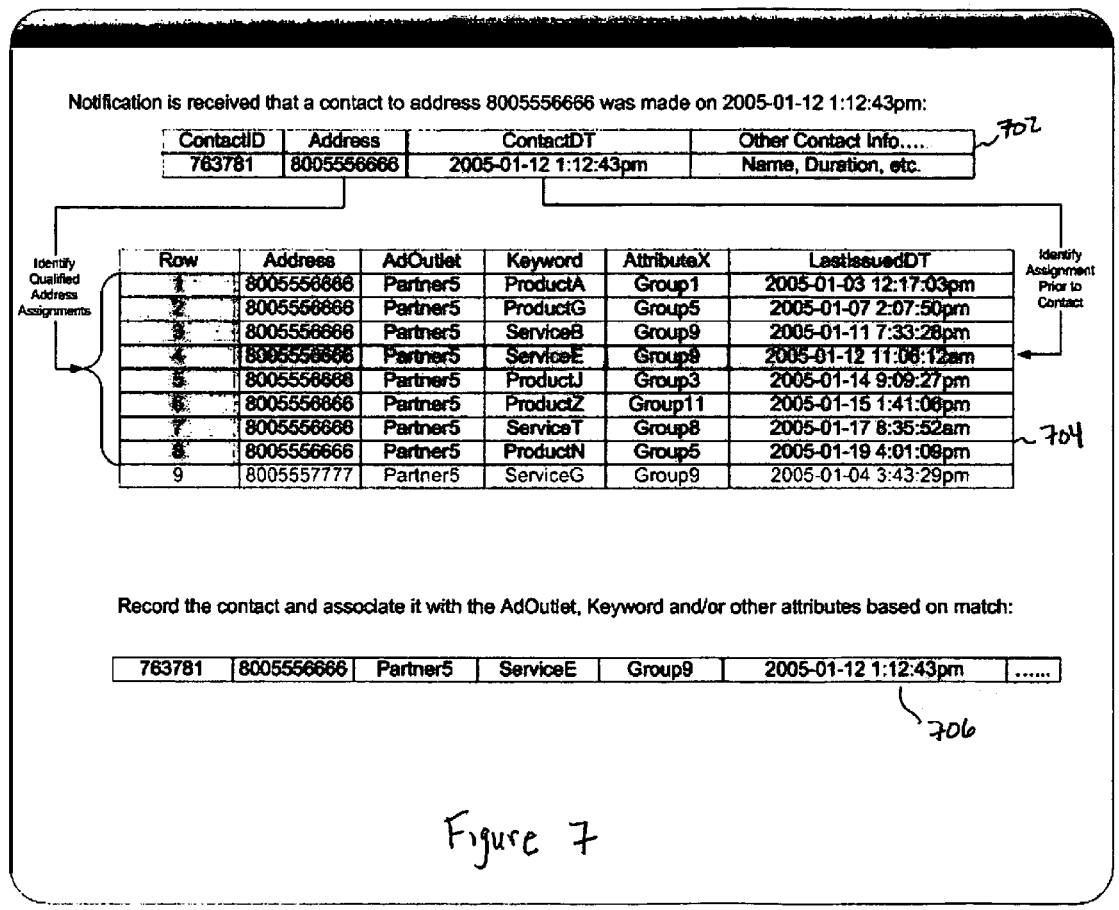
FIG. 7 is an illustrative drawing depicting an example of functions of an address matching process in accordance with an embodiment of the invention.

FIG. 7 is an illustrative drawing depicting an example of functions of an address matching process in accordance with an embodiment of the invention. In one embodiment, a computer program process running on the address server 120 performs the address matching process. However, it will be appreciated that the address matching process may take place separately from the address assignment process, on a different computer, for example.

Address report 702 contains an indication that a specific contact instance completed over the second network (ContactifD) 763781 called on address 8005556666 at Date/Time 2005-01-12 1:12:43 pm. Thus, for example, two calls from the same person would have two different ContactIDs. In this example, the address report may include additional contact information such as name of caller, duration of the call, etc. The address report may be assembled either manually or automatically by a call center or other service that receives or redirects/routes calls directed to 8005556666. Note that such report need not be assembled at the receiving end, and may be assembled instead at some point during the routing process. The address report may be communicated to the address matching process by any suitable means such as in a computer file transmitted over a network or through delivery of a CD through the mail, for example. The processes by which the address report is assembled and delivered to the matching process are not important to the practice of the invention and will be readily understood by persons of ordinary skill in the art. Also, the mechanism by which this data is captured (manually or automatically) is not important to the practice of the invention.

An address assignment history database 704 stored by server 120 indicates that the address 8005556666 has been reassigned eight times to eight different attribute combinations (Rows 1-8). Each row indicates an attribute combination to which the address was associated and the most recent Date/Time (LastIssuedDT) that such address was assigned to the attribute combination in that row. For instance, Row 4 indicates that address 80005556666 was last assigned to the attribute combination Partner5+ServiceE+Group9 on Date/Time 2005-01-12 11:06: 12 am. Row 8, for example, indicates that that same address 80005556666, was last assigned to attribute combination Partner5+ProductN+Group5 on Date/Time 2005-01-19 4:01:09 pm. Row 9 pertains to a different address, 8005557777. It will be appreciated that the address history assignment database 704 shown in FIG. 7 may be merely an illustrative small segment of a much larger database. Moreover, it will be appreciated that the information in the address assignment history database 704 can be built up over a significant period of time such as days or weeks or even more, for example.

The address assignment process of FIG. 3 searches the address assignment history database 704 for records with addresses that match the address in the address report 702. These records contain attribute combinations eligible to be matched to the address report 702. In this example, there are eight Rows in that database 704 with addresses that match the address in the report 702, i.e. Rows 1-8. Thus, there are eight records eligible for matching in this example. In one embodiment, an address in an address report is matched to an attribute combination in the address history database 704 based upon temporal proximity of the Date/Time stamped in the address report to corresponding Date/Times of eligible records in the database 704.

By way of further explanation, the address assignment history database 704 typically will show the same address reassigned numerous times to different attribute combinations at different date/times. The LastIssuedDT information is used to match communications over the second network 104 using an assigned address to attribute combinations assigned to the address. Basically, in one embodiment, the address assignment process is designed to maximize the likelihood that a visitor on the first network 102 who is assigned an address associated with certain attributes will communicate on the second network 104 during a time interval that the assigned address is still associated with those same attributes, i.e. before reassignment to a new combination of attributes. Thus, the address assignment process of FIG. 3 can be tuned heuristically so as to not reassign an address too soon after it has been assigned, and the attribute matching process of FIG. 4 uses temporal proximity between the Date/Time of the address report 702 and the Date/Time of eligible records as a criterion for matching address reports to attribute combinations. In essence, the proximity of Date/Time in an address report to the Date/Times in eligible records in the assignment history database 704 is used to match a communication over the second network 104 to the attributes relating to a visitor's request to a network information provider 116 over the first network 102.

In this example, records of Rows 1-8 of the address history assignment database 704 are eligible because each of these records stores the same address as the address in the address report 702, i.e. 8005556666. Moreover, in this example, the eligible record in Row 4 of the database 704 matches to the address report 702 because the LastIssuedDT of the Row 4 record is closer in time to the ContactDT in the address report than any of the other seven eligible records.

In response to the match, the matching process produces a new contact record 706, which provides an association between an attribute combination and a communication on the second network 104. In this example, the contact record includes the attributes of Row 4 of the address assignment history database 704, i.e. Partner5+ServiceE+Group9. Thus, an advertiser or promoter could conclude that promotional activity on the first network 102 involving the attribute combination Partner5+ServiceE+Group9, resulted in a subsequent communication over the second network 104.

Figure 8:
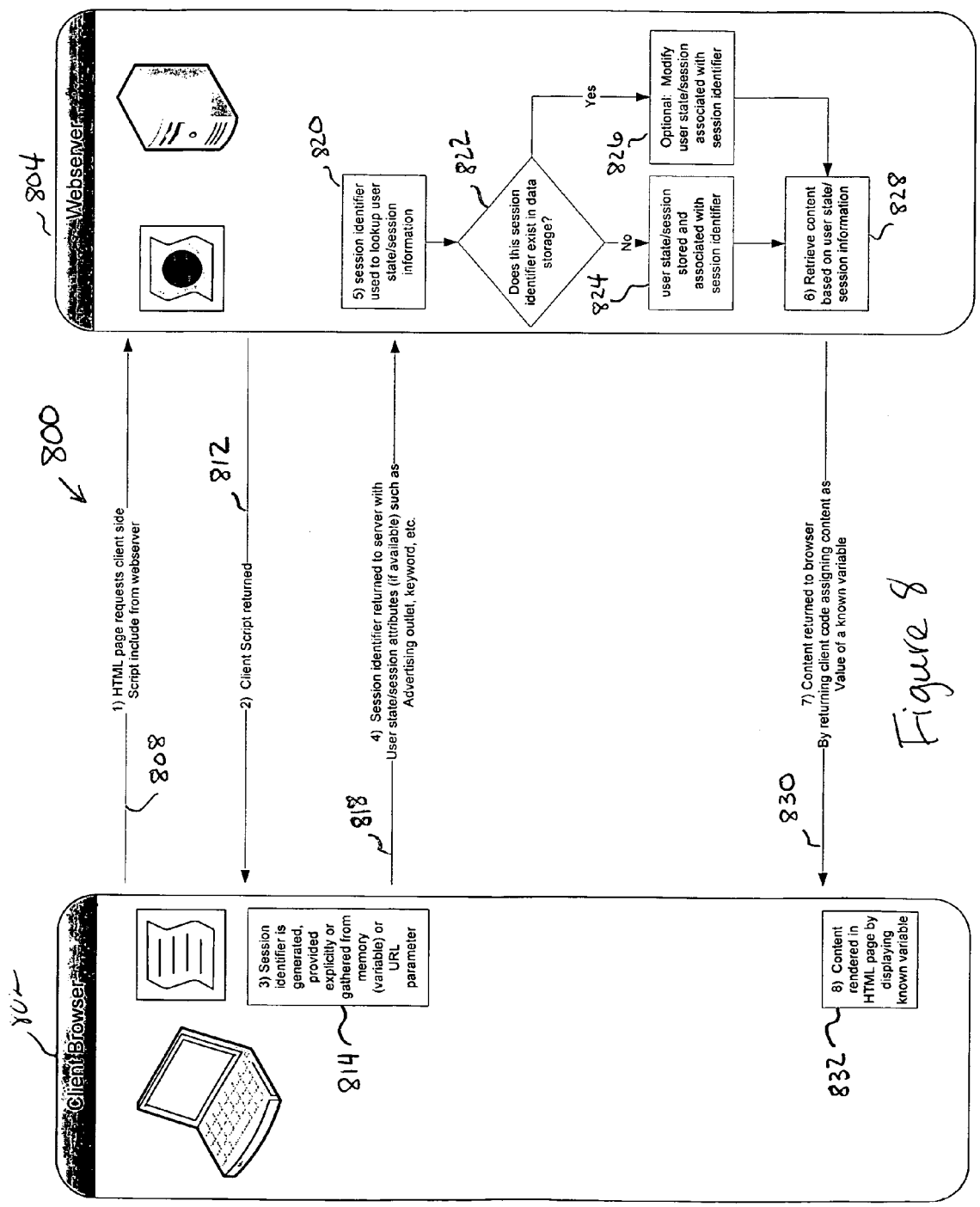
FIG. 8 is an illustrative flow diagram of a communication process between a browser enabled client device and a web server used to track a user "click path" during an internet session in accordance with one embodiment of the invention.

FIG. 8 is an illustrative flow diagram of a session tracking process 800 between a browser enabled client device 802 and a web server 804 in accordance with an embodiment of the invention. In one embodiment, the client device 802 corresponds to client device 106 of FIGS. 1-2, and web server 804 corresponds to server 116 of FIGS. 1-2., An internet session involves a sequence of individual page requests by an internet user. In one embodiment, session tracking involves a process that tracks a web visitor's "click path" during an internet session. An objective of the session tracking process is to follow a web site visitor from page to page as the visitor clicks from one web page to another or as the visitor clicks though a series of web pages. Of course, by "click" it is meant that a web page visitor selects a hyperlink appearing on a web page displayed on the visitor's client device 106. Each click results in delivery over the first network 104 of a web page having a network location corresponding to a URL associated with the clicked hyperlink. The challenge is to keep track of a visitor as that visitor clicks from web page to web page.

Typically web visitors are tracked by storing a unique ID on the client device (e.g., via a "cookie") or by passing a unique ID from page to page via each consecutive link. Generally either approach to session tracking is acceptable as well as any other technique of session tracking known to those skilled in the art. Basically, in one embodiment, through a session tracking technique, an identifier may be generated or located for a given user—and this identifier is provided to the address server via a memory storage location (variable), a URL parameter, or other means.

Accordingly, the process 800 takes a different approach. Identifying information or identifier is gathered from a web visitor's client device each time the visitor clicks onto a new web page. The gathered identifying information is compared with previously gathered information in order to track movements of the web visitor from web page to web page. In step 808, the client device 802 sends to the web server 804 an HTML request for a client side script. In one embodiment, the client side script request is included in the web page delivered by the network information provider server 116. In step 812, the web server 804 sends to the client device 802 a client side script with client IP address, for example. In step 814, the client device 802 runs the client side script, which can gather or generate an identifier that allows this users session to be distinguished from other user sessions.

In step 818, the client device 802 sends the identifying value to the web server 804. In step 820, a process running on the web server uses the returned identifying information to attempt to look up user state/session information stored in a session database (not shown). In decision step 822, a determination is made as to whether the session identifier exists in the session database. If the session identifier does not exist in the session database, then in step 824 a new session/state information, such as adoutlet, keyword, campaign or other information used for the purpose of identifying which address to return is stored in association with the received attribute/hash information. Once the session/state info such as adoutlet, keyword, etc is identified based on the session identifier—this is then used to select an address via the address server. It is associated with the session identifier during the initial contact by that user (e.g., when the adoutlet/keyword/etc were provided in the URL). It was stored off at that time in relation to this session identifier—then looked up based on this session identifier on subsequent requests (when these values are NOT available on the URL). If the session identifier does exist in the session database, then in step 826. In certain scenarios—a person may arrive at the advertiser site from multiple search engines or affiliates over time—therefore the attributes (adoutlet/keyword) may need to be updated as they return to the site from multiple advertising sites. In step 828, content, such as a telephone number or SMS address any text, images, products . . . . Any content corresponding to the session identifier is collected. Content encompasses addresses (phone numbers) as well as possible "calls to action" as indicated elsewhere. The use of "Content" was only to generalize what may be retrieved for delivery. Note that this collection may involve an assignment process such as that described with reference to FIG. 3 if an address is to be selected. In step 830, the web server 804 sends the collected content to the client device 802. In step 832, the client device 802 displays the content, such as a telephone number or SMS address, on a web page.

Therefore, the session tracking process 800 advantageously permits the same content, such as a selected telephone number, to be displayed on each web page visited by a web visitor using the client device 802. This identifier is used to match back to prior web visits using the same device 802 to thereby track web visitor activity, since the identifier typically does not change in the course of an internet session.

While the invention has been described herein with reference to various illustrative features, aspects and embodiments, it will be appreciated that the invention is susceptible of variations, modifications and other embodiments, other than those specifically shown and described. The invention is therefore to be broadly interpreted and construed as including all such alternative variations, modifications and other embodiments within its spirit and scope as hereinafter claimed.

The invention claimed is:

1. A computer implemented method of tracking user activity across different networks comprising:
   receiving from a networked device over a first network a request for an address on a second network;
   receiving from the networked device first and second attributes that are indicative of a source that can lead a user to send a request for information over the first network, the first and second attributes including one or more of an identifier that represents a URL, an identifier that represents a URL associated with an Internet search engine, a keyword, or a combination of a URL and a keyword;
   dynamically selecting from a computer readable medium an address on the second network, the dynamic selection based upon at least one of, recentness of prior associations with the respective addresses and respective attributes, recentness of sending of the respective addresses previously associated with respective attributes, and frequency of sending of the respective addresses previously associated with the respective attributes;
   associating the dynamically selected address and the first attribute and storing the association to an electronic storage medium;
   sending the dynamically selected address to the networked device over the first network; and
   reassigning the dynamically selected address to the second attribute.

2. The method of claim 1 further comprising:
   using the association to associate a subsequent communication to the dynamically selected address over the second network with the first attribute received over the first network.

3. The method of claim 1 further comprising:
   receiving information indicating that a communication has been directed to the dynamically selected address over the second network; and
   using the association to associate the communication to the dynamically selected address over the second network with the first attribute received over the first network.

4. The method of claim 1, wherein the dynamically selected address on the second network comprises a telephone number.

5. The method of claim 1, wherein the dynamically selected address on the second network comprises an SMS number.

6. The method of claim 1, wherein the step of selecting comprises selecting an address that previously was associated with a previously received attribute.

7. The method of claim 1, wherein the source comprises an Internet search engine.

8. The method of claim 1, wherein the source comprises an identification of an Internet web page located through an organic Internet search.

9. The method of claim 1, wherein the source comprises an Internet web page.

10. The method of claim 1, wherein the source comprises an advertisement.

11. The method of claim 1, wherein the request for the address over the first network comprises a request for a web page.

12. The method of claim 1,
wherein the step of selecting comprises dynamically selecting the address from among respective addresses previously associated with respective attributes based at least in part upon recentness of prior associations with the respective addresses and the respective attributes.

13. A non-transitory tangible computer readable storage medium having a computer readable program code embodied therein, wherein the computer readable program code is adapted to be executed to implement a method of tracking user activity across different networks comprising:
receiving over a first network at a first address on the first network from a network device on the first network a request for an address on a second network;
receiving over the first network at the first address on the first network from the network device on the first network an attribute that is indicative of a source that can lead a user to send a request for information over the first network to a second address on the first network, the attribute including one or more of an identifier that represents a URL, an identifier that represents a URL associated with an Internet search engine, a keyword, or a combination of a URL and a keyword;
dynamically selecting from a computer readable medium an address on the second network, the dynamic selection based upon at least one of, recentness of nor associations with the respective addresses and respective attributes recentness of sending of the respective addresses previously associated with respective attributes, and frequency of sending of the respective addresses previously associated with the respective attributes;
associating the address and the received attribute;
assigning the address to the received attribute and storing the association to an electronic storage medium; and
sending the address to the network device over the first network.

14. The non-transitory tangible computer readable storage medium of claim 13,
wherein the first network device is associated with the second address on the first network.

15. The non-transitory tangible computer readable storage medium of claim 13,
wherein the first network device is a user device that comprises a display that can lead a user to send the request for information over the first network to the second address on the first network.

16. The non-transitory tangible computer readable storage medium of claim 13, wherein first network device is associated with the second address on the first network; and
wherein the request for information over the first network comprises a request to the first network device for a web page.

17. The non-transitory tangible computer readable storage medium of claim 13, wherein the first address on the first network comprises an Internet address; and
wherein the address on the second network comprises a telephone number.

18. The non-transitory tangible computer readable storage medium of claim 13,
wherein the first address on the first network comprises an Internet address; and
wherein the address on the second network comprises an SMS number.

19. A non-transitory tangible computer readable storage medium having a computer readable program code embodied therein, wherein the computer readable program code is adapted to be executed to implement a method of tracking user activity across different networks comprising:
receiving from a first networked user device over a first network a request for an address on a second network;
receiving from the first networked user device an attribute that is indicative of a source that can lead a user to send a request to a second networked device over the first network, the attribute including one or more of an identifier that represents a URL, an identifier that represents a URL associated with an Internet search engine, a keyword, or a combination of a URL and a keyword;
dynamically selecting an address from a computer readable medium on the second network, the dynamic selection based upon at least one of, recentness of prior associations with the respective addresses and respective attributes recentness of sending of the respective addresses previously associated with respective attributes, and frequency of sending of the respective addresses previously associated with the respective attributes;
assigning the dynamically selected address to the received attribute; and
sending the selected address to the first networked user device over the first network and storing the assigned dynamically selected address to an electronic storage medium.

20. The non-transitory tangible computer readable storage medium of claim 19, further comprising: using the association to associate a subsequent communication to the dynamically selected address over the second network with the attribute received over the first network.

21. The non-transitory tangible computer readable storage medium of claim 19, further including: receiving information indicating that a communication has been directed to the dynamically selected address over the second network; and
using the association to associate the communication to the dynamically selected address over the second network with the attribute received over the first network.

22. A computer implemented method of tracking user activity across different networks comprising:
receiving from a first networked device over a first network a request for an address on a second network;
receiving from the first networked device an attribute that is indicative of a source that can lead a user to send a request to the first networked device over the first network, the attribute including one or more of an identifier that represents a URL, an identifier that represents a URL associated with an Internet search engine, a keyword, or a combination of a URL and a keyword;
dynamically selecting from a computer readable medium at least one of a plurality of addresses on the second network, the dynamic selection based upon at least one of, recentness of prior associations with the respective addresses and respective attributes, recentness of sending of the respective addresses previously associated with respective attributes, and frequency of sending of the respective addresses previously associated with the respective attributes;
associating the dynamically selected address and the received attribute and storing the association to an electronic storage medium;
assigning the dynamically selected address to the received attribute;

sending the dynamically selected address to the first networked device over the first network in response to the request for an address on a second network; and reassigning the dynamically selected address to a subsequently received attribute.

23. The method of claim 22, further comprising:

using the association to associate a subsequent communication to the dynamically selected address over the second network with the attribute received over the first network.

24. The method of claim 22, further comprising:

receiving information indicating that a communication has been directed to the dynamically selected address over the second network; and using the association to associate the communication to the dynamically selected address over the second network with the attributes received over the first network.

\* \* \* \* \*